(No Model.)
W. BEGG.
LOOM LET-OFF MOTION.
No. 483,626. Patented Oct. 4, 1892.
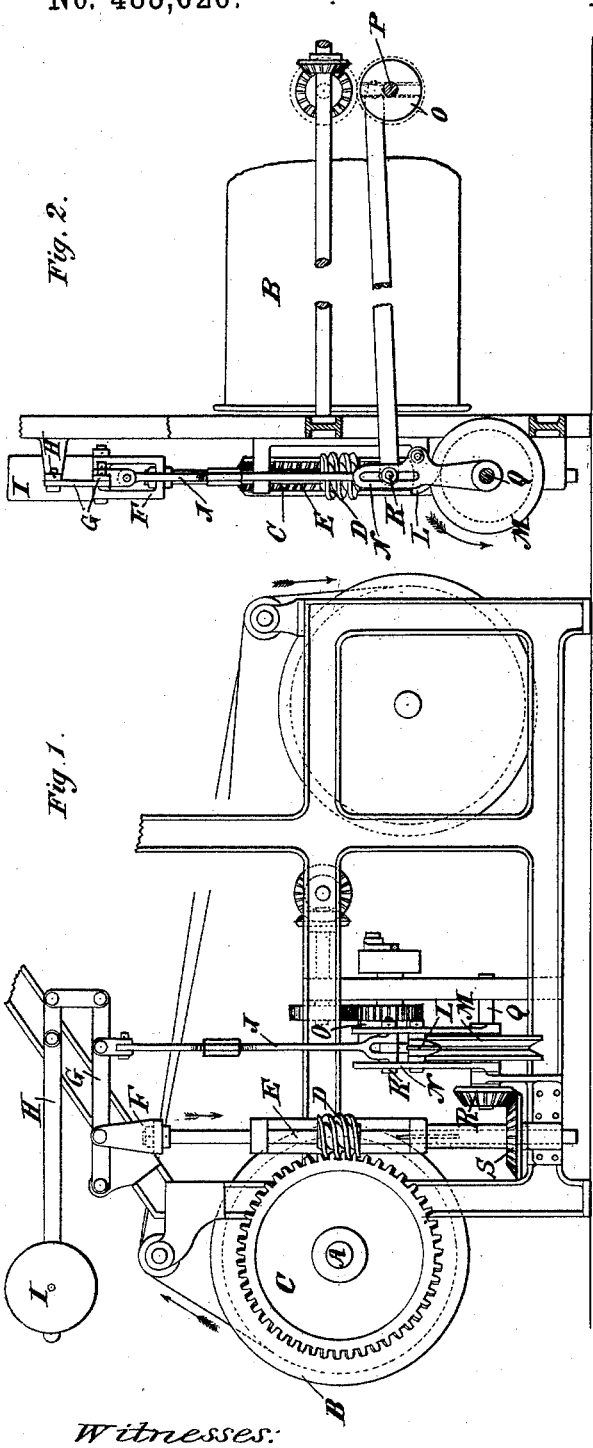
Witnesses:
E. B. Bolton
S. F. Jones
Inventor:
William Begg
By Reinhardt
his Attorneys

UNITED STATES PATENT OFFICE.

WILLIAM BEGG, OF GLASGOW, SCOTLAND.

LOOM LET-OFF MOTION.

SPECIFICATION forming part of Letters Patent No. 483,626, dated October 4, 1892.

Application filed April 8, 1892. Serial No. 428,324. (No model.) Patented in England February 23, 1891, No. 3,235.

*To all whom it may concern:*

Be it known that I, WILLIAM BEGG, a citizen of the United Kingdom of Great Britain and Ireland, residing at 633 Springfield Road, Parkhead, Glasgow, in the county of Lanark, Scotland, have invented new and useful Improvements in Loom Let-Off Motions, (which have not been patented in any country except Great Britain by Letters Patent dated the 23d day of February, 1891, No. 3,235;) and I do hereby declare that the following is a full, clear, and exact description of the invention, which will enable others skilled in the art or manufacture to which it relates to make and use the same.

This invention relates to looms for weaving more especially wire-cloth; and it consists of improvements in the letting-off motion of such looms.

In the accompanying drawings, Figures 1 and 2 are elevations at right angles to each other; and Fig. 3 is a plan of part of a wire-loom, showing the improved letting-off motion.

On the end of the beam-spindle A, carrying the warp-beam B, is secured a worm-wheel C in gear with a worm D on a vertical spindle E, carried in bearings in a bracket-piece F, hung from a lever G, jointed to a lever H, provided with a counter-weight I, so adjusted that when the warp-beam B gives off quickly the worm-wheel acts on the worm D as a pinion on a rack and depresses the worm-spindle E, and with it the end of the lever G. From said lever G is hung a link J, at the lower end of which is a stud or pin K, working in a slotted lever N, on which is centered a pawl L, operating a ratchet or friction wheel M, the stud or pin K, and with it the lever N, being acted on by an eccentric O on the heddle cam-shaft P or other shaft of the loom.

On the spindle Q, carrying the ratchet or friction wheel M, is fixed a worm or bevel wheel R, gearing with a worm-wheel or bevel-wheel S, carried by the vertical shaft E, suspended from the counterweighted lever, and the rotation imparted to said vertical shaft E is communicated through the worm D on it and the worm-wheel C, gearing with it to the warp-beam B, which is turned to a greater or less extent, according as the pin K moves in the slotted lever N, and the pawl L gives more or less throw in engagement with the ratchet or friction wheel M, the tension on the warp being thus regulated.

The weight is adjusted to maintain the worm in working position for a certain speed of beam and strain of warp—that is, so long as the strain remains the same the beam will be driven by the worm and worm-wheel at the proper speed and the engagement between the said worm-wheel and worm will hold the shaft E in the predetermined position, and the link-pin will be held in one position to make the movement imparted to the beam the proper one. Should the strain on the warp increase, the worm-wheel will tend to move in advance of the movement imparted by the worm, and thus acting upon said worm will move it down and through the shaft E and the intermediate lever and link connections. This movement will be imparted to the link-pin, which will thus be shifted to give a greater throw to the pawl L, and consequently a greater movement to the beam through the gearing described. As soon as this undue strain of the warp-threads has ceased the weight I returns the worm and shaft to normal position, thus shifting the link-pin K back to normal position also.

Having now described the invention, what I desire to claim and secure by Letters Patent is—

1. In combination, the beam, the worm-wheel thereon, the worm engaging the said wheel, the longitudinally-movable shaft, the gearing connected with the shaft for rotating it, the driving connections for operating the said gearing, consisting of the eccentric rod and pin K and the slotted lever with the pawl thereon, and the connections from the vertical shaft to the pin for adjusting the same to vary the throw of the pawl as the worm-shaft is moved longitudinally, substantially as described.

2. In combination, the beam, the worm-wheel and worm, the longitudinally-movable shaft E, carrying the said worm, the gearing for rotating the said shaft, the driving connections therefor, including the ratchet-wheel, the slotted lever carrying the pawl and the eccentric rod and pin K thereon engaging said slot, the weight for controlling the movement of the shaft E longitudinally, and the connections from the pin K to the shaft E for controlling the position of said pin, consisting of the link J and the lever G, substantially as described.

3. In combination, the beam, the worm-wheel and worm, the longitudinally-movable shaft carrying the said worm, the pawl and ratchet-wheel and connections therefrom to the worm-shaft for rotating the same, the lever carrying the pawl, the means for operating the lever, having an adjustable connection therewith movable toward and from the center of oscillation of said lever, the weight for acting upon the longitudinally-movable shaft, and the connections from the said adjustable connection to the longitudinally-movable shaft, controlled by the movement of said shaft, substantially as described.

In witness whereof I have hereunto set my hand and seal this 30th day of January, 1892.

WILLIAM BEGG. [L. S.]

Witnesses:
WALLACE FAIRWEATHER,
C. E., *Chartered Patent Agent, 62 St. Vincent Street, Glasgow.*
JNO. ARMSTRONG, Junr.,
*Clerk, 62 St. Vincent Street, Glasgow.*